US012809417B2

(12) United States Patent
Fujiwara et al.

(10) Patent No.: US 12,809,417 B2
(45) Date of Patent: Nov. 24, 2026

(54) SIGNAL GENERATION APPARATUS AND SIGNAL GENERATION METHOD

(71) Applicant: ANRITSU CORPORATION, Kanagawa (JP)

(72) Inventors: Takaki Fujiwara, Kanagawa (JP); Hironori Yoshioka, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 49 days.

(21) Appl. No.: 19/219,496

(22) Filed: May 27, 2025

(65) Prior Publication Data

US 2026/0050285 A1 Feb. 19, 2026

(30) Foreign Application Priority Data

Aug. 15, 2024 (JP) ................................ 2024-135705

(51) Int. Cl.
*G06F 1/04* (2006.01)

(52) U.S. Cl.
CPC ...................................... *G06F 1/04* (2013.01)

(58) Field of Classification Search
CPC ........................................................ G06F 1/04
See application file for complete search history.

(56) References Cited

U.S. PATENT DOCUMENTS 7,080,292 B2 * 7/2006 Moore ............. G01R 31/31937 714/817
2003/0018442 A1 * 1/2003 Yamaguchi ............. G06F 17/15 702/69
2003/0156673 A1 * 8/2003 Yanai ...................... H04L 1/205 375/371
2011/0235694 A1 * 9/2011 Stephens .......... G01R 31/31709 375/226

FOREIGN PATENT DOCUMENTS

JP 6651432 B2 2/2020

* cited by examiner

*Primary Examiner* — Zahid Choudhury
(74) *Attorney, Agent, or Firm* — McDonald Hopkins LLC

(57) ABSTRACT

A clock source configured to generate a clock of a reference frequency; a jitter modulation source configured to generate a jitter clock by applying a modulation to the clock of the reference frequency generated by the clock source; a signal generation source configured to generate a time series pattern signal of a Test Flow at a timing of the jitter clock in order to perform a test; and an operation unit configured to set a type of pattern for each flow of the time series pattern signal, a manual or automatic switching method for each flow, and a transmission time of a pattern for each flow in the automatic switching method in a pattern setting list in tabular form, in which the time series pattern signal of the Test Flow is transmitted to a device under test W in accordance with the settings of the operation unit.

10 Claims, 5 Drawing Sheets

SIGNAL GENERATION APPARATUS AND SIGNAL GENERATION METHOD

TECHNICAL FIELD

The present invention relates to a signal generation apparatus and a signal generation method for generating a signal for performing a Receiver Frequency variation test (a test of clock variation tolerance of a receiver) defined in the compliance test specification (CTS) of the USB4 v2 Gen4 standard.

BACKGROUND ART

In the related art, an error rate measurement apparatus that inputs a known pattern signal to a device under test and measures a bit error rate of input data received from the device under test in response to the input of this pattern signal by comparing the bit error rate with the pattern signal is known.

Among these types of error rate measurement apparatuses, for example, as disclosed in Patent Document 1 below, there is an error rate measurement apparatus which is configured with a plurality of modules such as a pattern generation module, an error measurement module, a modulated signal generation module, a jitter module, an emphasis module, a multiplexing conversion module, and an inverse multiplexing conversion module, and which combines desired modules depending on the content of the measurement to perform various types of measurements of the device under test based on standards in various forms.

Incidentally, in recent years, a Receiver Frequency variation test has been defined in the compliance test specification (CTS) of the USB4 v2 Gen4 standard as an item for testing the clock variation tolerance of a device. The above test is defined in CTS Revision 0.9, sections 4.3.4, 4.3.5, 6.3.3, and the like.

As shown in the Appendix-Receiver Frequency variation test flow diagram of CTS Revision 0.9, a sequence in which the Test Flow of the above test defines two patterns, TYPE I and TYPE II, and the transmission pattern is switched one after another according to time series is performed. The transmission time of each pattern in the sequence defined by the above standard is on the order of several usec at the minimum.

RELATED ART DOCUMENT

Patent Document

[Patent Document 1] Japanese Patent No. 6651432

DISCLOSURE OF THE INVENTION

Problem that the Invention is to Solve

In the method of switching patterns by operating a signal generation source (the pattern generation module of Patent Document 1) and a jitter modulation source (the jitter module of Patent Document 1) in coordination with each other using a control device of the error rate measurement apparatus in the related art, including the above-mentioned Patent Document 1, the switching was not completed in time, and the above-mentioned Receiver Frequency variation test sequence could not be realized.

Furthermore, in the Receiver Frequency variation test, it is necessary to set a frequency deviation amount of the clock to change several usec after the pattern is switched, and this operation also requires an operation on the order of usec, which cannot be realized with the current mechanism.

Furthermore, in the related art, since it was difficult for users to ascertain, on a screen, the configuration of the test sequence for performing a Receiver Frequency variation test, there were problems with tests being performed with incorrectly set test sequence parameters, resulting in test results that were not attributable to the device under test or the time-consuming task of identifying the cause during debugging, thereby reducing the development efficiency of the device under test.

Therefore, the present invention has been made in consideration of the above problems, and an object of the present invention is to provide a signal generation apparatus and a signal generation method that can generate a signal with a transmission time and frequency deviation amount as defined by the standard.

Means for Solving the Problem

In order to achieve the above object, according to claim 1 of the present invention, there is provided a signal generation apparatus including: a clock source (2) configured to generate a clock of a reference frequency; a jitter modulation source (3) configured to generate a jitter clock by applying a modulation to the clock of the reference frequency generated by the clock source; a signal generation source (4) configured to generate a time series pattern signal of a Test Flow defined by a predetermined standard at a timing of the jitter clock in order to perform a Receiver Frequency variation test; and an operation unit (5) configured to set a type of pattern for each flow of the time series pattern signal, a manual or automatic switching method for each flow, and a transmission time of a pattern for each flow in the automatic switching method in a pattern setting list (21) in tabular form, in which the time series pattern signal of the Test Flow is transmitted to a device under test in accordance with the settings of the operation unit.

According to claim 2 of the present invention, there is provided the signal generation apparatus in which as a test sequence configuration (20), the time series pattern signal of the Test Flow is displayed in sequence in order of Flow numbers, and a frequency deviation amount of the clock with a horizontal axis representing time is displayed on a vertical axis in correspondence with the Flow numbers.

According to claim 3 of the present invention, there is provided the signal generation apparatus in which the transmission time of the pattern for each flow in the automatic switching method is optionally increased or decreased by the operation unit (5) within a predetermined range including a time defined by the standard.

According to claim 4 of the present invention, there is provided the signal generation apparatus in which in the test sequence configuration (20), a flow including a portion where the frequency deviation amount of the clock changes is highlighted in an identifiable manner from other flows.

According to claim 5 of the present invention, there is provided the signal generation apparatus in which in the pattern setting list (21), a background of a Flow item to which a currently transmitted pattern belongs is highlighted.

According to claim 6 of the present invention, there is provided a signal generation method including: a step of generating, by a clock source (2), a clock of a reference frequency; a step of generating, by a jitter modulation source (3), a jitter clock by applying a modulation to the clock of the reference frequency generated by the clock source; a step of generating, by a signal generation source (4), a time series pattern signal of a Test Flow defined by a predetermined standard at a timing of the jitter clock in order to perform a Receiver Frequency variation test; a step of setting, by an operation unit (5), a type of pattern for each flow of the time series pattern signal, a manual or automatic switching method for each flow, and a transmission time of a pattern for each flow in the automatic switching method in a pattern setting list (21) in tabular form; and a step of transmitting the time series pattern signal of the Test Flow to a device under test in accordance with the settings of the operation unit.

According to claim 7 of the present invention, there is provided the signal generation method further including: a step of displaying, as a test sequence configuration (20), the time series pattern signal of the Test Flow in sequence in order of Flow numbers, and displaying a frequency deviation amount of the clock with a horizontal axis representing time on a vertical axis in correspondence with the Flow numbers.

According to claim 8 of the present invention, there is provided the signal generation method further including: a step of optionally increasing or decreasing, by the operation unit (5), the transmission time of the pattern for each flow for which the switching method is set to automatic within a predetermined range including a time defined by the standard.

According to claim 9 of the present invention, there is provided the signal generation method further including: a step of highlighting, in the test sequence configuration (20), a flow including a portion where the frequency deviation amount of the clock changes in an identifiable manner from other flows.

According to claim 10 of the present invention, there is provided the signal generation method further including: a step of highlighting, in the pattern setting list (21), a background of a Flow item in the pattern setting list to which a currently transmitted pattern belongs.

Advantage of the Invention

According to the present invention, it is possible to transmit a test sequence for performing the Receiver Frequency variation test defined in the CTS of the USB4 v2 Gen4 standard with a transmission time and frequency deviation amount as defined by the standard.

It is also possible to visually ascertain the configuration of the test sequence for performing the Receiver Frequency variation test. Accordingly, since users can easily ascertain the configuration of the test sequence on the screen, it is possible to avoid test results that are not attributable to the device under test, and it is also possible to eliminate the time-consuming task of identifying the cause during debugging, thereby improving the development efficiency of the device under test.

Furthermore, since the transmission time of the pattern can be optionally increased or decreased within a predetermined range including the time defined by the standard, it becomes easy to test the tolerance (margin) of the device under test for transmission times that deviate from the standard in each flow.

BEST MODE FOR CARRYING OUT THE INVENTION

Hereinafter, an embodiment of the present invention will be described in detail with reference to the accompanying drawings.

Figure 1:
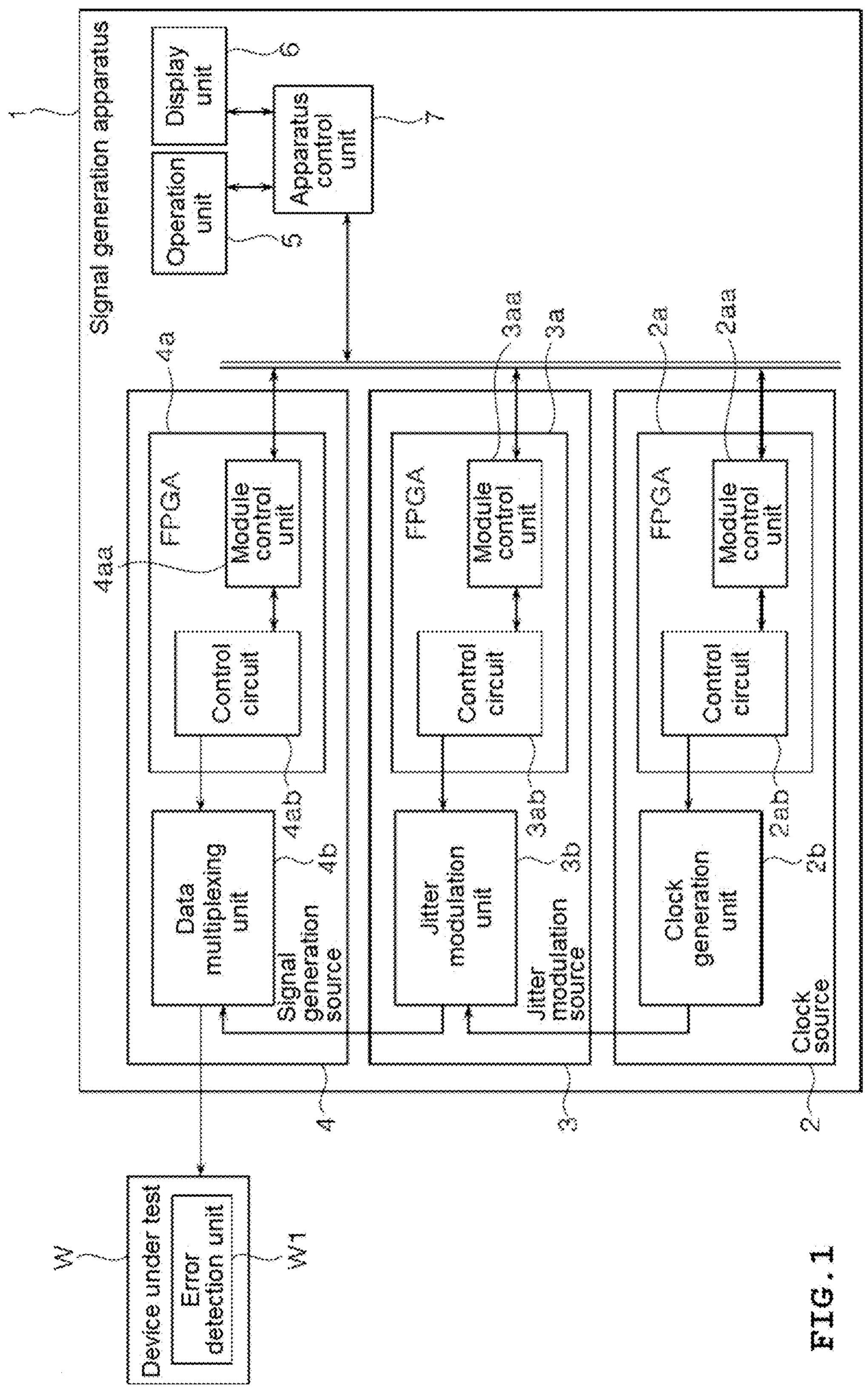
FIG. 1 is a block diagram showing a schematic configuration of a signal generation apparatus according to the present invention.

As shown in FIG. 1, a signal generation apparatus 1 according to the present embodiment is schematically configured to include a clock source 2, a jitter modulation source 3, a signal generation source 4, an operation unit 5, a display unit 6, and an apparatus control unit 7, and has a function of generating two patterns of signals of time series of Test Flow TYPE I or TYPE II defined in Appendix F-Receiver Frequency variation test flow diagram in CTS of the USB4 v2 Gen4 standard in order to realize a sequence of Receiver Frequency variation test (a test of clock variation tolerance of a receiver).

In addition, the present embodiment is not limited to the USB4 v2 Gen4 standard, but the present invention can also be applied to high-speed bus standards (for example, standards after USB4 v2 Gen4) that define time series signals equivalent to the above-mentioned Test Flow TYPE I and TYPE II signals.

A device under test W also incorporates an error detection unit W1 that detects the presence or absence of an error in the time series signal input from the signal generation source 4 of the signal generation apparatus 1.

Figure 2:
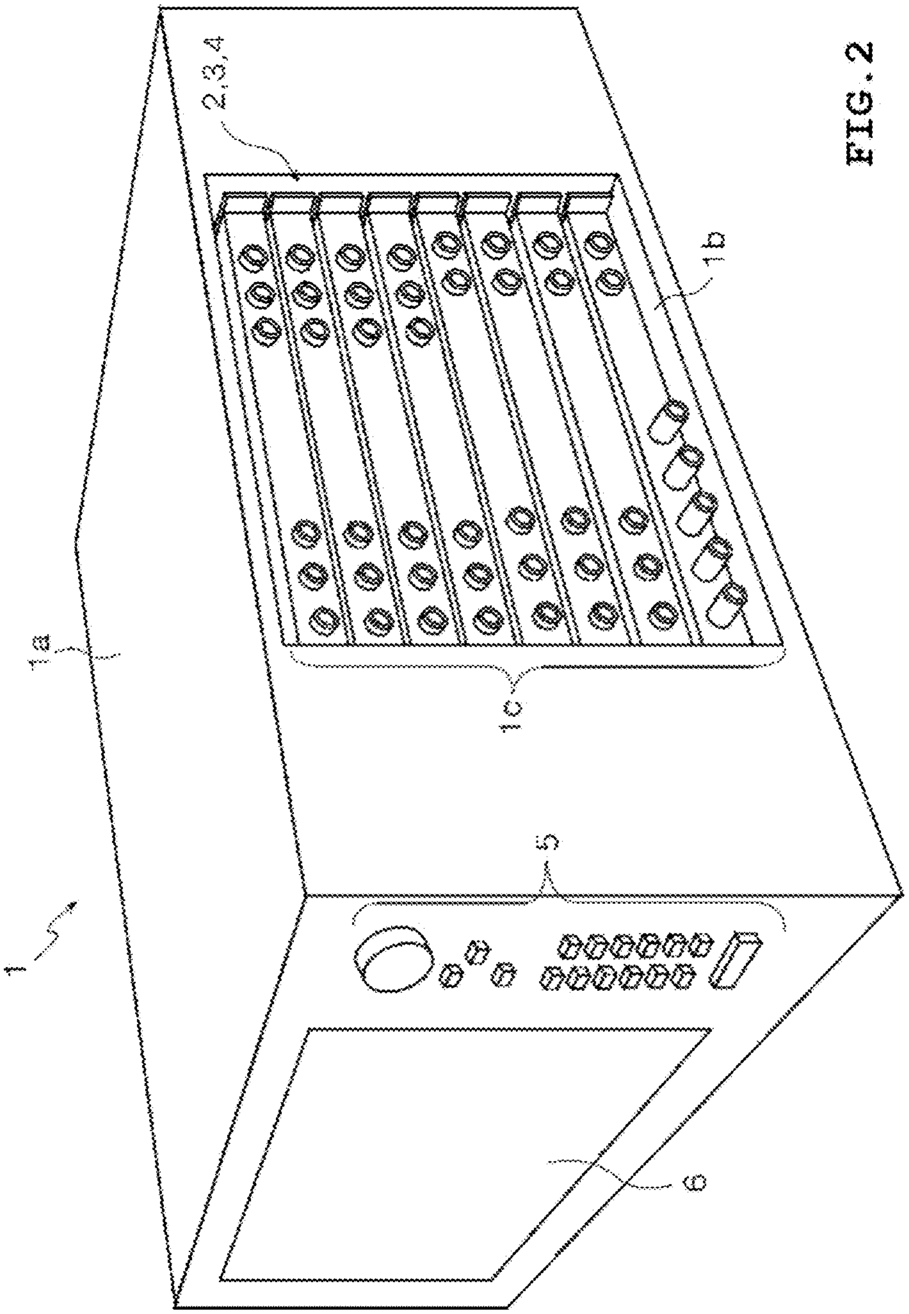
FIG. 2 is a perspective view showing an appearance of the signal generation apparatus according to the present invention.

As shown in FIG. 2, the signal generation apparatus 1 has an apparatus main body 1*a* formed of a rectangular housing, and an opening 1*b* is formed on the side surface of the apparatus main body 1*a*. A plurality of slots (eight slots in the example of FIG. 2) 1*c* are provided in the opening 1*b* of the apparatus main body 1*a*.

The clock source 2, the jitter modulation source 3, and the signal generation source 4 are configured as modules that are selectively attachable to and detachable from the slots 1*c* of the apparatus main body 1*a*. In the example of FIG. 2, a state in which modules are mounted in all the slots 1*c* of the apparatus main body 1*a* is shown. In practice, the signal generation apparatus 1 functions by selectively mounting modules (three modules) of each of the clock source 2, the jitter modulation source 3, and the signal generation source 4 in the slots 1*c* of the apparatus main body 1*a*. In the slots 1*c* of the apparatus main body 1*a*, a suitable combination of modules required for generating a signal having a frequency transition pattern defined by a desired standard is selected and mounted, and modules can be added, removed, and rearranged.

In addition, by mounting an error detector module in the slots 1*c* of the apparatus main body 1*a*, the module can also function as an error rate measurement apparatus that receives a signal that is returned when a test signal is input to the device under test W and measures the error rate.

The clock source 2 generates a reference clock (a clock of a reference frequency) under the control of the apparatus control unit 7 connected, for example, via Ethernet (registered trademark), and includes an FPGA 2*a* and a clock generation unit 2*b*.

The FPGA 2*a* includes a module control unit 2*aa* and a control circuit 2*ab*. The module control unit 2*aa* also serves as an interface connecting the apparatus control unit 7 and the control circuit 2*ab*. In addition to outputting an instruction (command) from the apparatus control unit 7 to the control circuit 2*ab*, the module control unit 2*aa* also executes some of the processing and control within the clock source 2.

The control circuit 2*ab* causes the clock generation unit 2*b* to generate a clock of a reference frequency according to an instruction (command) from the apparatus control unit 7.

The clock generation unit 2*b* generates a clock of a reference frequency under the control of the control circuit 2*ab* based on an instruction (command) from the apparatus control unit 7.

The jitter modulation source 3 generates a jitter clock by applying a desired modulation to the clock of the reference frequency generated by the clock source 2 under the control of the apparatus control unit 7 connected, for example, via Ethernet (registered trademark), and includes an FPGA 3*a* and a jitter modulation unit 3*b*.

The FPGA 3*a* includes a module control unit 3*aa* and a control circuit 3*ab*. The module control unit 3*aa* also serves as an interface connecting the apparatus control unit 7 and the control circuit 3*ab*. In addition to outputting an instruction (command) from the apparatus control unit 7 to the control circuit 3*ab*, the module control unit 3*aa* also executes some of the processing and control within the jitter modulation source 3.

The control circuit 3*ab* controls the jitter modulation unit 3*b* in response to an instruction (command) from the apparatus control unit 7 to generate a jitter clock by applying a desired modulation to the clock of the reference frequency generated by the clock source 2.

The jitter modulation unit 3*b* generates a jitter clock by applying a desired modulation to the clock of the reference frequency generated by the clock source 2 under the control of the control circuit 3*ab* based on an instruction (command) from the apparatus control unit 7.

The signal generation source 4 generates a pattern signal (a pulse pattern signal with a desired repetitive pattern) defined in the USB4 v2 Gen4 standard for input to the device under test W under the control of the apparatus control unit 7 connected, for example, via Ethernet (registered trademark), using a jitter clock generated by the jitter modulation source 3, and includes an FPGA 4*a* and a data multiplexing unit 4*b*.

The FPGA 4*a* includes a module control unit 4*aa* and a control circuit 4*ab*. The module control unit 4*aa* also serves as an interface connecting the apparatus control unit 7 and the control circuit 4*ab*. In addition to outputting an instruction (command) from the apparatus control unit 7 to the control circuit 4*ab*, the module control unit 4*aa* also executes some of the processing and control within the signal generation source 4.

In response to an instruction (command) from the apparatus control unit 7, the control circuit 4*ab* outputs a parallel signal that is the basis of a pattern signal (serial signal) defined in the USB4 v2 Gen4 standard to the data multiplexing unit 4*b*.

The data multiplexing unit 4*b* multiplexes the parallel signal input from the control circuit 4*ab* in accordance with a timing of the jitter clock generated by the jitter modulation source 3 to generate a desired serial signal.

The operation unit 5 is configured with, for example, various keys, switches, buttons, and soft keys on the display screen of the display unit 6 that are equipped on the main body of the signal generation apparatus 1, and the like, and the user operates and inputs various types of information necessary for the signal generation apparatus 1 to generate the desired signal.

The display unit 6 is configured with display devices such as a liquid crystal display, an electroluminescence (EL: electric light emitting) display, a CRT, and the like, and under the control of the apparatus control unit 7, displays setting item screens related to the generation of desired signals (including the pattern setting s in FIGS. 3 and 4 to be described below) and operation targets such as buttons, soft keys, pull-down menus, input boxes, and the like for setting various conditions on the setting item screens. In addition to the above, the signal generation apparatus 1 is also configured with a control means including, for example, a central processing unit (CPU), a graphics processing unit (GPU), a read only memory (ROM), a random access memory (RAM), and a hard disk drive (HDD).

Figure 3:
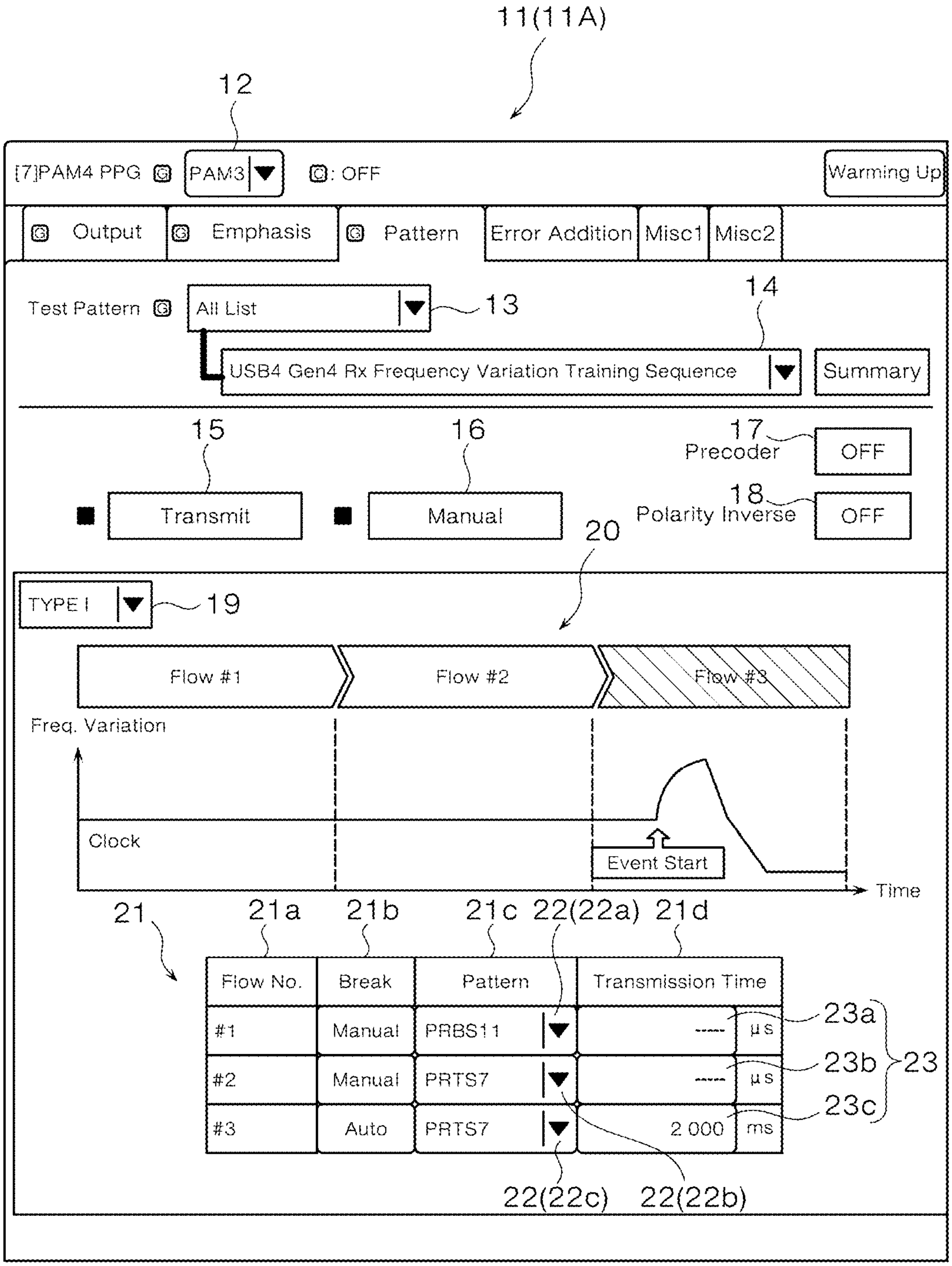
FIG. 3 is an example of a pattern setting screen of the signal generation apparatus according to the present invention, which is a diagram showing a pattern setting screen relating to Test Flow TYPE I of the CTS standard of USB4 v2 Gen4.
Figure 4:
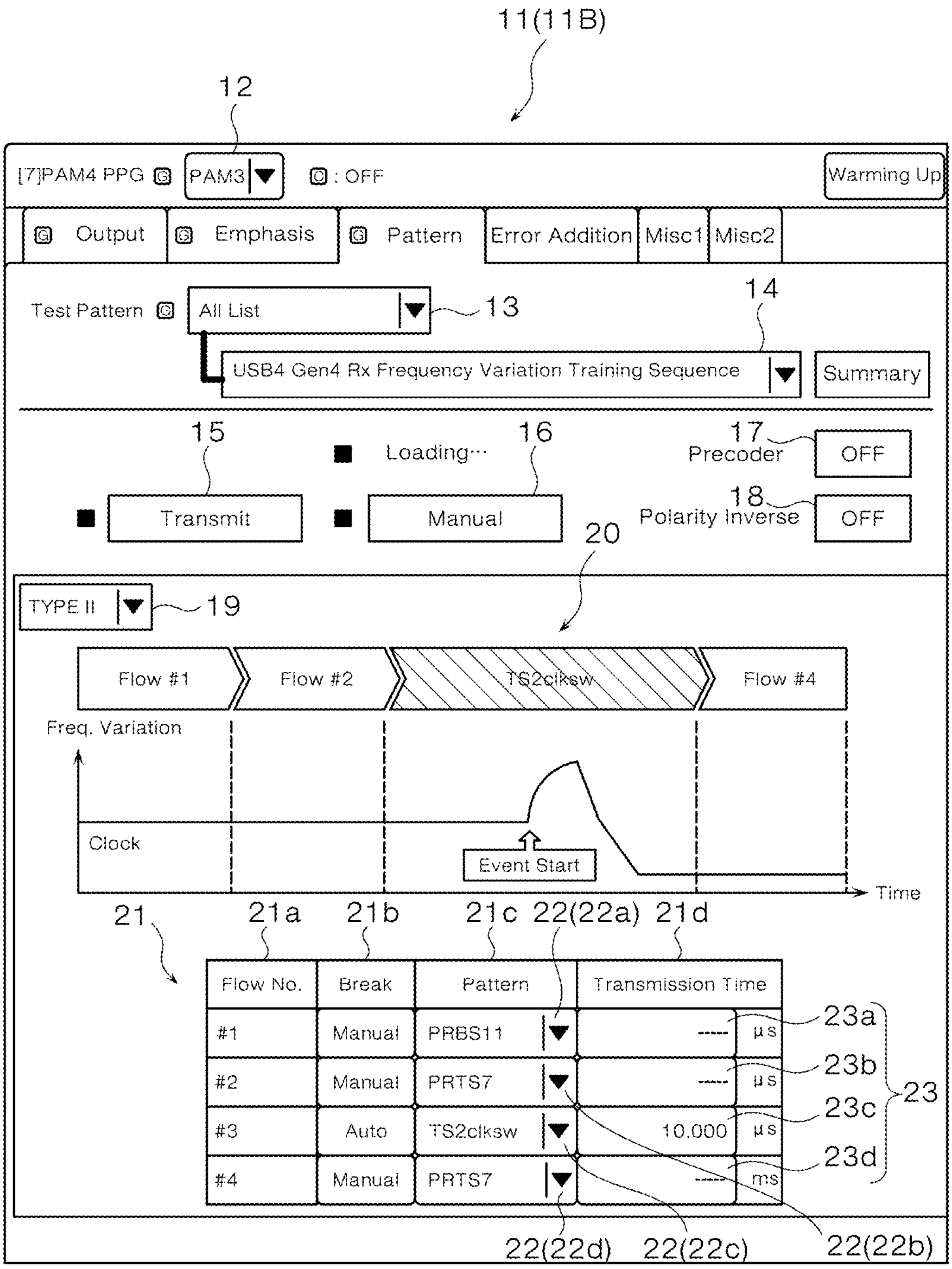
FIG. 4 is an example of a pattern setting screen of the signal generation apparatus according to the present invention, which is a diagram showing a pattern setting screen relating to Test Flow TYPE II of the CTS standard of USB4 v2 Gen4.

Here, FIGS. 3 and 4 show an example of the pattern setting screen 11 (11A, 11B) of the signal generation source 4. To describe further, FIG. 3 is a pattern setting screen 11A relating to Test Flow TYPE I of the CTS standard of USB4 v2 Gen4, and FIG. 4 is a pattern setting screen 11B relating to Test Flow TYPE II of the CTS standard of USB4 v2 Gen4.

A pull-down menu 12 for setting the type of signal to be generated is displayed at the top of the pattern setting screens 11A and 11B in FIGS. 3 and 4. The pattern setting screens 11A and 11B in FIGS. 3 and 4 show a state in which "PAM3" has been selected from the pull-down menu 12. At the lower portion of this pull-down menu 12, tabs for a plurality of items related to signal generation are displayed: "Output", "Emphasis", "Pattern", "Error Addition", "Misc 1", and "Misc 2". The pattern setting screens 11A and 11B in FIGS. 3 and 4 show a state in which the "Pattern" tab is selected in order to set the signal generated by the signal generation source 4. At the lower portion of this "Pattern" tab, an item related to test patterns, "Test Pattern", is displayed. In this "Test Pattern", the standard of the signal to be generated is selected from a predetermined list using pull-down menus 13 and 14 and is set. The pattern setting screen 11 in FIGS. 3 and 4 shows the state in which "All List" is selected from the pull-down menu 13 of the "Test Pattern" and "USB4 Gen4 Rx Frequency Variation Training Sequence" is selected from the pull-down menu 14.

On the pattern setting screens 11A and 11B of FIGS. 3 and 4, a Transmit button 15, a Manual button 16, a Precoder switch button (initial value: OFF) 17, and a Polarity Inverse switch button (initial value: OFF) 18 are displayed at the lower portion of "Test Pattern".

The Transmit button 15 starts and stops transmission of a pattern. When pressed in an unpressed state of an initial value, the Transmit button 15 starts transmitting a pattern, and when pressed again in a pressed state, the Transmit button 15 stops transmitting the pattern being transmitted.

The Manual button 16 transitions the pattern being transmitted to the next Flow, and when pressed, transitions the pattern being transmitted to the next Flow.

The Precoder switch button 17 switches the precoder between ON and OFF. The initial value is set to OFF, and each time the Precoder switch button 17 is pressed, ON/OFF is switched.

The Polarity Inverse switch button 18 switches Polarity Inverse between ON and OFF. The initial value is set to OFF, and each time the Polarity Inverse switch button 18 is pressed, ON/OFF is switched.

A pull-down menu 19 is displayed at the lower portion of the Transmit button 15 for selecting which of the two Test Flow patterns (TYPE I, TYPE II) defined in the CTS standard to use. The pattern setting screen 11A in FIG. 3 shows a state in which "TYPE I" has been selected from the pull-down menu 19, and the pattern setting screen 11B in FIG. 4 shows a state in which "TYPE II" has been selected from the pull-down menu 19.

A test sequence configuration 20 is displayed in the center of the pattern setting screens 11A and 11B in FIGS. 3 and 4. As this test sequence configuration 20, the Flow number (hereinafter referred to as Flow No.) is displayed in sequence in numerical order, and the Clock Freq. Variation (the frequency deviation amount of the clock [PPM]) with a horizontal axis representing time is displayed on a vertical axis in correspondence with the Flow No.

At the lower portion of the pattern setting screens 11A and 11B in FIGS. 3 and 4, a pattern setting list 21 in tabular form corresponding to the test sequence configuration 20 is displayed. The pattern setting list 21 consists of a plurality of items, namely "Flow No." 21*a*, "Break" 21*b*, "Pattern" 21*c*, and "Transmission Time" 21*d*, and the plurality of items are set for each flow.

"Flow No." 21*a* indicates the Flow number of the entire sequence corresponding to the test sequence configuration 20, and is displayed in ascending order starting from #1. On the pattern setting screen 11A of FIG. 3, #1, #2, and #3 are displayed in that order, corresponding to Flow #1, Flow #2, and Flow #3 of the Flow No. in the test sequence configuration 20. On the pattern setting screen 11B of FIG. 4, #1, #2, #3, and #4 are displayed in that order, corresponding to Flow #1, Flow #2, TS2clksw, and Flow #4 of the Flow No. in the test sequence configuration 20.

In "Break" 21*b*, "Manual" or "Auto" is set as a condition for transition to the signal of the next Flow for the target Flow. When "Break" is set to "Manual", pressing the Manual button transitions to the next Flow. In contrast, when "Auto" is set, after the Flow starts, the flow transitions to the next Flow when the time set in "Transmission Time" has elapsed.

"Pattern" 21*c* is set by selecting a transmission pattern from a pull-down menu 22 for each flow (22*a*, 22*b*, and 22*c* on the pattern setting screen in FIG. 3, and 22*a*, 22*b*, 22*c*, and 22*d* on the pattern setting screen in FIG. 4). On the pattern setting screen 11A of FIG. 3, the setting ranges for Flows #1 to #3 are PRBSn (n=7, 9, 10, 11, 13, 15, 20, 23, 31) and PRTSn (n=7, 19), and the initial value of Flow #1 is set to PRBS11, and the initial values of Flow #2 and Flow #3 are set to PRTS7. On the pattern setting screen 11B of FIG. 4, the setting ranges of Flows #1, #2, and #4 are PRBSn (n=7, 9, 10, 11, 13, 15, 20, 23, 31) and PRTSn (n=7, 19), the setting range of Flow #3 is fixed to TS2clksw, the initial value of Flow #1 is set to PRBS11, the initial values of Flow #2 and Flow #4 are set to PRTS7, and the initial value of Flow #3 is set to TS2clksw.

"Transmission Time" 21*d* is set by inputting a numerical value into an input box 23 for each Flow (23*a*, 23*b*, and 23*c* on the pattern setting screen of FIG. 3, and 23*a*, 23*b*, 23*c*, and 23*d* on the pattern setting screen of FIG. 4) to indicate how long it takes from the start of transmission of the Flow signal for the Flow to transition to the next Flow, for a Flow with "Break" set to "Auto". On the pattern setting screen 11A of FIG. 3, the setting range of Flows #1 and #2 is 10.0 to 20.0 us in 0.1 us steps, the setting range of Flow #3 is 1 to 10000 ms in 1 ms steps, the initial value of "Auto" Flow #1 and #2 is set to 10.0 μs, and the initial value of "Auto" Flow #3 is set to 2000 ms. On the pattern setting screen 11B of FIG. 4, the setting range of Flows #1 to #3 is 10.0 to 20.0 us in 0.1 us steps, the setting range of Flow #4 is 1 to 10000 ms in 1 ms steps, the initial values of "Auto" Flows #1 to #3 are set to 10.0 μs, and the initial value of "Auto" Flow #4 is set to 2000 ms.

In addition, in the test sequence configuration 20 of FIGS. 3 and 4, the flow that includes the portion where the frequency deviation amount of the clock changes (Event Start in the drawing) is highlighted in an identifiable manner from other flows. In test sequence configuration 20 of FIG. 3, Flow #3 shown with diagonal lines is highlighted in an identifiable manner, and in the test sequence configuration 20 of FIG. 4, TS2clksw shown with diagonal lines is highlighted in an identifiable manner.

In addition, in the pattern setting list 21 of FIGS. 3 and 4, in order to make it possible to know which Flow pattern is currently being transmitted, the background of the Flow item to which the pattern being transmitted belongs (the entire row of the relevant Flow: all items) is highlighted.

Furthermore, on the pattern setting screen 11 of FIGS. 3 and 4, the pull-down menu 22 of the "Pattern" (22*a*, 22*b*, and 22*c* in the pattern setting screen 11A of FIG. 3, and 22*a*, 22*b*, 22*c*, and 22*d* in the pattern setting screen 11B of FIG. 4) allows the user to set a pattern selected from a pseudo-random pattern that has been optionally set and registered in advance in addition to a PRBS or PRTS having a predetermined number of stages in accordance with the standard.

The apparatus control unit 7 integrally controls each unit such as the clock source 2, the jitter modulation source 3, the signal generation source 4, the operation unit 5, and the display unit 6. That is, for example, the apparatus control unit 7 causes the display unit 6 to display various setting screens including the setting screen of the signal generation source 4 shown in FIG. 3, generates a clock of a reference frequency based on an operation input from the operation unit 5, generates a jitter clock, and causes the clock source 2, the jitter modulation source 3, and the signal generation source 4 to generate a desired signal (for example, a signal having a frequency transition pattern defined by a desired standard as shown in FIG. 4).

Next, an operation when the signal generation apparatus 1 configured as described above generates a signal for performing a Receiver Frequency variation test defined in CTS of the USB4 v2 Gen4 standard will be described.

First, an operation when the signal type defined in the Test Flow of the CTS standard is TYPE I will be described.

When generating a TYPE I signal, "PAM3" is selected from the pull-down menu 12 as the type of signal to be generated on the pattern setting screen 11A of FIG. 3.

Next, in "Test Pattern" on the pattern setting screen 11A in FIG. 3, "All List" is selected from the pull-down menu 13, "USB4 Gen4 Rx Frequency Variation Training Sequence" is selected from the pull-down menu 14, and the standard of the signal to be generated is set.

Next, on the pattern setting screen 11A of FIG. 3, "TYPE I" is selected from the pull-down menu 19 as the signal type and set.

Then, as necessary, the Precoder switch button 17 and the Polarity Inverse switch button 18 are pressed to switch from "OFF" to "ON".

Next, in the pattern setting list 21 of the pattern setting screen 11A in FIG. 3, Break 21*b* of each Flow No. 21 is set to "Manual" or "Auto". Here, Flow #1 and Flow #2 are set to "Manual" and Flow #3 is set to "Auto".

Next, "Pattern" 21*c* of each "Flow No." 21 is selected from the pull-down menu 22 (22*a*, 22*b*, and 22*c*) and set. Here, Flow #1 is set to "PRBS11", and Flow #2 and Flow #3 are set to "PRTS7".

Then, a numerical value is input and set in the input box 23 (23*a*, 23*b*, and 23*c*) of "Transmission Time" 21*d* of the "Flow No." for which "Break" 21*b* is set to "Auto". Here, the numerical value "2000" ms is input and set in the input box 23*c* of "Transmission Time" 21*d* of Flow #3, which is set to "Auto".

As described above, the setting is completed. Thereafter, when the Transmit button 15 is pressed, the apparatus control unit 7 controls the clock source 2, the jitter modulation source 3, and the signal generation source 4 in accordance with the settings to transmit a TYPE I signal defined in the Test Flow of the CTS standard. Specifically, when the Transmit button 15 is pressed, a PRBS11 signal is first transmitted in Flow #1. Thereafter, when the Manual button 16 is pressed, a PRTS7 signal is transmitted in Flow #2. Furthermore, when the Manual button 16 is pressed, a PRTS7 signal is transmitted in Flow #3, and the frequency deviation amount of the clock is automatically changed by Event Start within a time from the start of transmission of this PRTS7 signal to the lapse of 2000 ms.

Next, an operation when the signal type defined in the Test Flow of the CTS standard is TYPE II will be described.

When generating a TYPE II signal, "PAM3" is selected from the pull-down menu 12 as the type of signal to be generated on the pattern setting screen 11B of FIG. 4.

Next, in "Test Pattern" on the pattern setting screen 11B in FIG. 4, "All List" is selected from the pull-down menu 13, "USB4 Gen4 Rx Frequency Variation Training Sequence" is selected from the pull-down menu 14, and the standard of the signal to be generated is set.

Next, on the pattern setting screen 11B of FIG. 4, "TYPE II" is selected from the pull-down menu 19 as the signal type and set.

Then, as necessary, the Precoder switch button 17 and the Polarity Inverse switch button 18 are pressed to switch from "OFF" to "ON".

Next, in the pattern setting list 21 of the pattern setting screen 11B in FIG. 4, Break 21*b* of each Flow No. 21 is set to "Manual" or "Auto". Here, Flow #1, Flow #2, and Flow #4 are set to "Manual" and Flow #3 is set to "Auto".

Next, "Pattern" 21*c* of each "Flow No." 21 is selected from the pull-down menu 22 (22*a*, 22*b*, 22*c*, and 22*d*) and set. Here, Flow #1 is set to "PRBS11", Flow #2 and Flow #4 are set to "PRTS7", and Flow #3 is set to "TS2clksw".

Then, a numerical value is input and set in the input box 23 (23*a*, 23*b*, 23*c*, and 23*d*) of "Transmission Time" 21*d* of the "Flow No." for which "Break" 21*b* is set to "Auto". Here, the numerical value "10.000" μs is input and set in the input box 23*c* of "Transmission Time" 21*d* of Flow #3, which is set to "Auto".

As described above, the setting is completed. Thereafter, when the Transmit button 15 is pressed, the apparatus control unit 7 controls the clock source 2, the jitter modulation source 3, and the signal generation source 4 in accordance with the settings to transmit a TYPE II signal defined in the Test Flow of the CTS standard. Specifically, when the Transmit button 15 is pressed, a PRBS11 signal is first transmitted in Flow #1. Thereafter, when the Manual button 16 is pressed, a PRTS7 signal is transmitted in Flow #2. Furthermore, when the Manual button 16 is pressed, a TS2clksw signal is transmitted in Flow #3, and the frequency deviation amount of the clock is automatically changed by Event Start within a time from the start of transmission of this TS2clksw signal to the lapse of 10 μs. Then, after 10 us has elapsed, a PRTS7 signal is transmitted in Flow #4.

Figure 5:
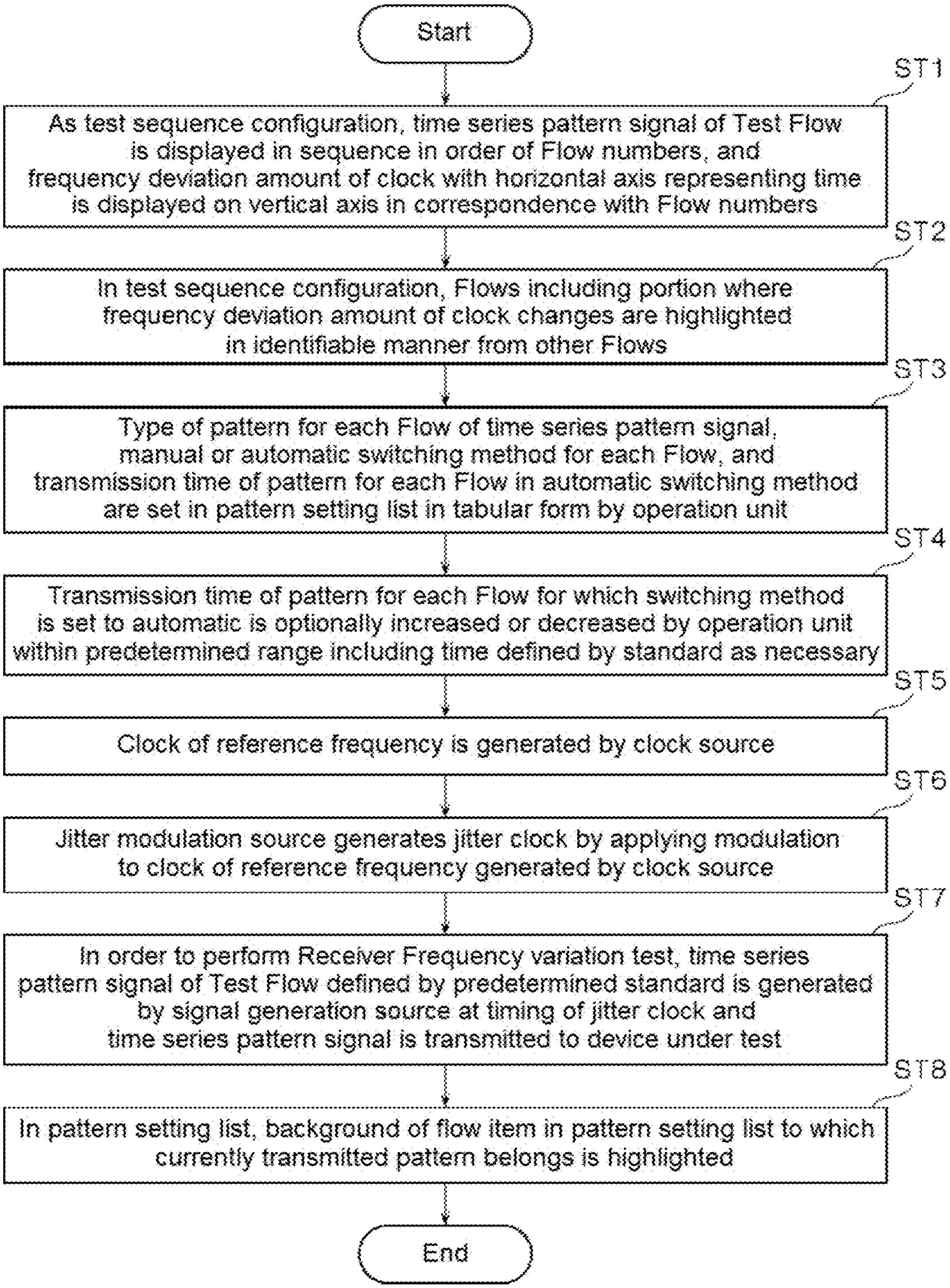
FIG. 5 is a diagram showing an example of a flowchart of a signal generation method by the signal generation apparatus according to the present invention.

Here, FIG. 5 shows an example of a flowchart of a signal generation method by the signal generation apparatus 1. In the present embodiment, in order to realize a Receiver Frequency variation test sequence (a test of clock variation tolerance of a receiver), two patterns of time series signals of Test Flow TYPE I or TYPE II are generated according to step (ST) in FIG. 5.

The order of some of the steps (ST) in FIG. 5 may be changed, and steps may be selectively performed as necessary, and the order and selection are not limited to those shown in FIG. 5.

First, as the test sequence configuration 20, the time series pattern signal of the Test Flow is displayed in sequence in order of Flow numbers, and the frequency deviation amount of the clock with the horizontal axis representing time is displayed on the vertical axis in correspondence with the Flow numbers (ST1 in FIG. 5).

In addition, in the test sequence configuration 20, flows including the portion where the frequency deviation amount of the clock changes (flows indicated by diagonal lines in FIG. 3 and FIG. 4) are highlighted in an identifiable manner from other flows (ST2 in FIG. 5).

Next, the type of pattern for each flow of the time series pattern signal, the manual or automatic switching method for each flow, and the transmission time of the pattern for each flow in the automatic switching method are set in the pattern setting list 21 in tabular form by the operation unit 5 (ST3 in FIG. 5).

The transmission time of the pattern for each flow in the automatic switching method can be optionally increased or decreased by the operation unit 5 within a predetermined range including the time defined by the standard as necessary (ST4 in FIG. 5).

Then, a clock of a reference frequency is generated by the clock source 2 (ST5 in FIG. 5).

Next, the jitter modulation source 3 generates a jitter clock by applying a modulation to the clock of the reference frequency generated by the clock source 2 (ST6 in FIG. 5).

Next, in order to perform a Receiver Frequency variation test, a time series pattern signal of the Test Flow defined by a predetermined standard is generated by the signal generation source 4 at the timing of the jitter clock from the jitter modulation source 3 (ST7 in FIG. 5).

Then, in the pattern setting list 21, the background of the Flow item in the pattern setting list 21 to which the currently transmitted pattern belongs is highlighted (ST8 in FIG. 5).

In this way, according to the present embodiment, it is possible to transmit a test sequence for performing the Receiver Frequency variation test defined in the CTS of the USB4 v2 Gen4 standard with a transmission time and frequency deviation amount as defined by the standard.

It is also possible to visually ascertain the configuration of the test sequence for performing the Receiver Frequency variation test. Accordingly, since users can easily ascertain the configuration of the test sequence on the screen, it is possible to avoid test results that are not attributable to the device under test, and it is also possible to eliminate the time-consuming task of identifying the cause during debugging, thereby improving the development efficiency of the device under test.

Furthermore, since the transmission time of the pattern can be optionally increased or decreased within a predetermined range including the time defined by the standard, it becomes easy to test the tolerance (margin) of the device under test for transmission times that deviate from the standard in each flow.

Although the best mode for the signal generation apparatus and the signal generation method according to the present invention has been described above, the present invention is not limited to the description and drawings of this mode. In other words, other modes, examples, operation techniques, and the like made by persons skilled in the art based on this mode are all included in the scope of the present invention.

DESCRIPTION OF REFERENCE NUMERALS AND SIGNS

1: Signal generation apparatus
1*a*: Apparatus main body
1*b*: Opening
1*c*: Slot
2: Clock source
2*a*: FPGA
2*aa*: Module control unit
2*ab*: Control circuit
2*b*: Clock generation unit
3: Jitter modulation source
3*a*: FPGA
3*aa*: Module control unit
3*ab*: Control circuit
3*b*: Jitter modulation unit
4: Signal generation source
4*a*: FPGA
4*aa*: Module control unit
4*ab*: Control circuit
4*b*: Data multiplexing unit
5: Operation unit
6: Display unit
7: Apparatus control unit
11 (11A, 11B): Pattern setting screen
12, 13, 14: Pull-down menu
15: Transmit button
16: Manual button
17: Precoder switch button
18: Polarity Inverse switch button
19: Pull-down menu
20: Test sequence configuration
21: Pattern setting list
21*a*: Flow No.
21*b*: Break
21*c*: Pattern
21*d*: Transmission Time
22 (22*a*, 22*b*, 22*c*, 22*d*): Pull-down menu
23 (23*a*, 23*b*, 23*c*, 23*d*): Input box
W: Device under test
W1: Error detection unit

What is claimed is:

1. A signal generation apparatus comprising:

a clock source configured to generate a clock of a reference frequency;

a jitter modulation source configured to generate a jitter clock by applying a modulation to the clock of the reference frequency generated by the clock source;

a signal generation source configured to generate a time series pattern signal of a Test Flow defined by a predetermined standard at a timing of the jitter clock in order to perform a Receiver Frequency variation test; and an operation unit configured to set a type of pattern for each flow of the time series pattern signal, a manual or automatic switching method for each flow, and a transmission time of a pattern for each flow in the automatic switching method in a pattern setting list in tabular form, wherein the time series pattern signal of the Test Flow is transmitted to a device under test in accordance with the settings of the operation unit.

2. The signal generation apparatus according to claim 1, wherein as a test sequence configuration, the time series pattern signal of the Test Flow is displayed in sequence in order of Flow numbers, and a frequency deviation amount of the clock with a horizontal axis representing time is displayed on a vertical axis in correspondence with the Flow numbers.

3. The signal generation apparatus according to claim 1, wherein the transmission time of the pattern for each flow in the automatic switching method is optionally increased or decreased by the operation unit within a predetermined: range including a time defined by the standard.

4. The signal generation apparatus according to claim 2, wherein in the test sequence configuration, a flow including a portion where the frequency deviation amount of the clock changes is highlighted in an identifiable manner from other flows.

5. The signal generation apparatus according to claim 1, wherein in the pattern setting list, a background of a Flow item to which a currently transmitted pattern belongs is highlighted.

6. A signal generation method comprising:

a step of generating, by a clock source, a clock of a reference frequency;

a step of generating, by a jitter modulation source, a jitter clock by applying a modulation to the clock of the reference frequency generated by the clock source;

a step of generating, by a signal generation source, a time series pattern signal of a Test Flow defined by a predetermined standard at a timing of the jitter clock in order to perform a Receiver Frequency variation test;

a step of setting, by an operation unit, a type of pattern for each flow of the time series pattern signal, a manual or automatic switching method for each flow, and a transmission time of a pattern for each flow in the automatic switching method in a pattern setting list in tabular form; and a step of transmitting the time series pattern signal of the Test Flow to a device under test in accordance with the settings of the operation unit.

7. The signal generation method according to claim 6, further comprising:

a step of displaying, as a test sequence configuration, the time series pattern signal of the Test Flow in sequence in order of Flow numbers, and displaying a frequency deviation amount of the clock with a horizontal axis representing time on a vertical axis in correspondence with the Flow numbers.

8. The signal generation method according to claim 6, further comprising:

a step of optionally increasing or decreasing, by the operation unit, the transmission time of the pattern for each flow for which the switching method is set to automatic within a predetermined range including a time defined by the standard.

9. The signal generation method according to claim 7, further comprising:

a step of highlighting, in the test sequence configuration, a flow including a portion where the frequency deviation amount of the clock changes in an identifiable manner from other flows.

10. The signal generation method according to claim 6, further comprising:

a step of highlighting, in the pattern setting list, a background of a Flow item in the pattern setting list to which a currently transmitted pattern belongs.

* * * * *